United States Patent [19]
Cheng

[11] Patent Number: 5,832,958
[45] Date of Patent: Nov. 10, 1998

[54] FAUCET

[76] Inventor: Tsan-Hsiung Cheng, No. 1051, Lung Tien, Lung Pen Tsun, Kuan Tien Hsiang, Tainan County, Taiwan

[21] Appl. No.: 923,602

[22] Filed: Sep. 4, 1997

[51] Int. Cl.[6] .................................................. F16K 11/076
[52] U.S. Cl. ..................................... 137/625.41; 137/616.7
[58] Field of Search ........................... 137/625.41, 616.3, 137/616.7

[56] References Cited

U.S. PATENT DOCUMENTS

| | | | |
|---|---|---|---|
| 3,322,152 | 5/1967 | Aechter | 137/625.41 |
| 4,398,668 | 8/1983 | Jette | 137/625.41 X |
| 4,727,906 | 3/1988 | Holzer | 137/616.7 X |
| 5,685,339 | 11/1997 | Lee | 137/625.41 |

*Primary Examiner*—John Fox
*Attorney, Agent, or Firm*—Varndell Legal Group

[57] ABSTRACT

An improved faucet generally comprises a housing, a hot water inlet, a cold water inlet, a hot water outlet, a cold water outlet, a hot water pipe, a cold water pipe, a ball valve, and a spout. The ball valve is provided with water passages such that the hot water outlet and cold water outlet can be suitably aligned with the passages of the ball valve. As a result, when the ball valve is rotated in three dimensions, the temperature of the water as well as the volume on the spout can be readily and conveniently controlled.

1 Claim, 6 Drawing Sheets

FAUCET

BACKGROUND OF THE INVENTION

The present invention relates to a faucet, more particularly to an improved faucet in which the hot and cold water can be readily controlled via a ball valve.

1. Description of Prior Art

The conventional faucet, as shown in FIG. 1, generally uses a spindle to drive a stem washer which can be completely and tightly seated onto the valve seat or released therefrom. Consequently, the water can be controlled to flow out from the spout or stopped. However, the stem washer tends to age or deteriorate after a period of usage. A leakage will be encountered accordingly, especially to the hot water faucet. As shown in FIG. 2, a new developed faucet has been disclosed. The stem washer and the valve seat are both made from ceramic material. However, these components shall be made with comparatively higher accuracy and it also has a complicated configuration. Accordingly, the cost of manufacturing and maintenance are relatively high.

2. Summary of the Invention

It is the objective of this invention to provide an improved faucet wherein the above described problems can be completely solved.

It is still the objective of this invention to provide an improved faucet wherein the hot and cold water can be readily controlled with a simple manipulation of the handle of the faucet. On the other hand, the volume can be also controlled.

In order to achieve the objective set forth, the improved faucet generally comprises a housing, a hot water inlet, a cold water inlet, a hot water outlet, a cold water outlet, a hot water pipe, a cold water pipe, a ball valve, and a spout. The ball valve is provided with water passages such that the hot water outlet and cold water outlet can be suitably aligned with the passages of the ball valve. As a result, when the ball valve is rotated in three dimensions, the temperature of the water as well as the outflow from the spout can be readily and conveniently controlled.

DETAILED DESCRIPTION OF PREFERRED EMBODIMENT

Figure 1:
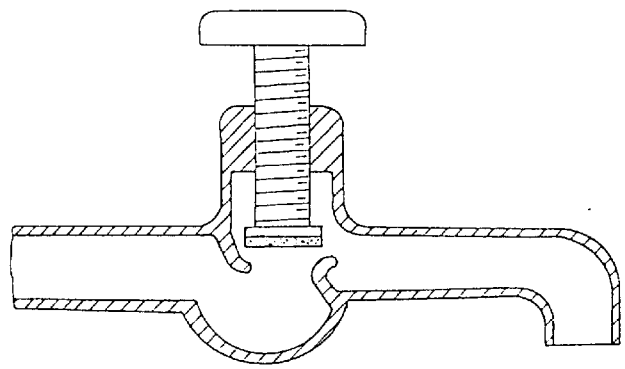
FIG. 1 is a sectional view of a conventional faucet.
Figure 2:
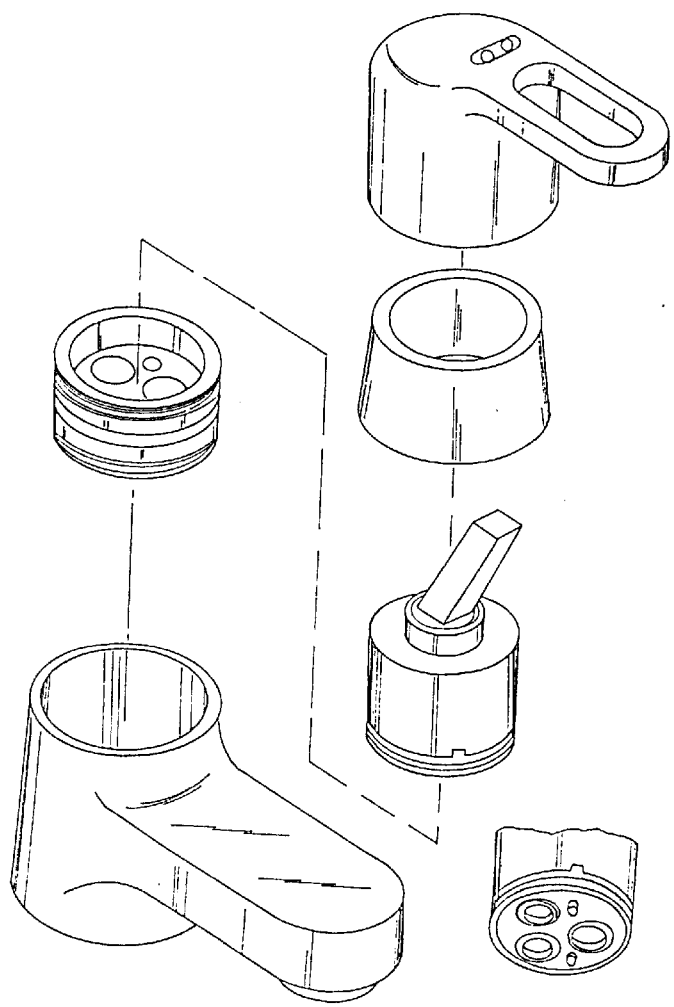
FIG. 2 is a exploded view of a ceramic conventional faucet.
Figure 3:
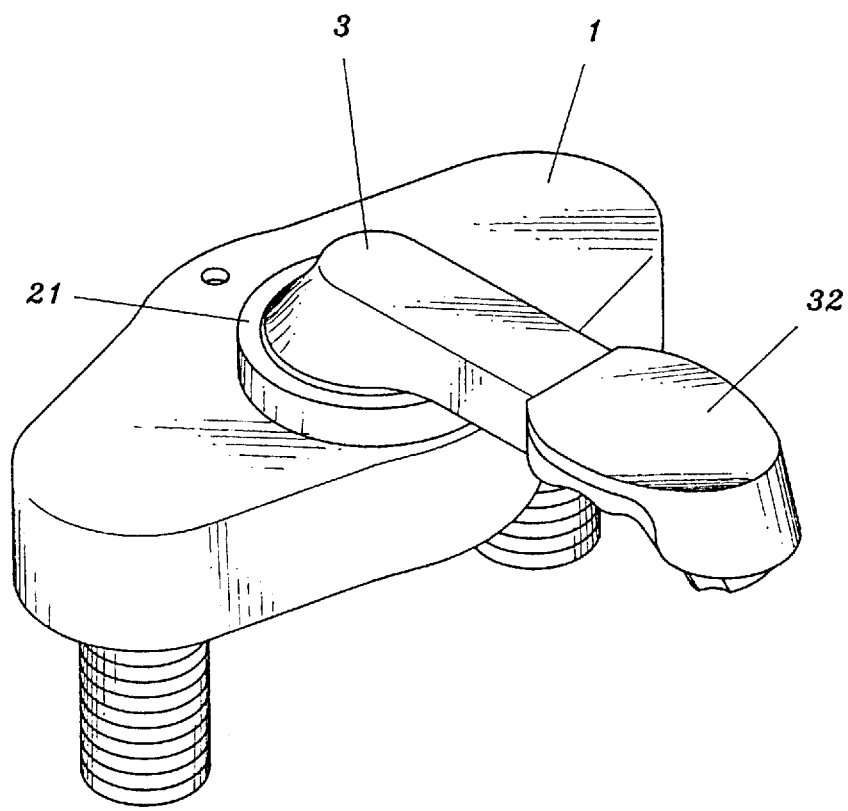
FIG. 3 is a perspective view of the faucet made according to the present invention.
Figure 4:
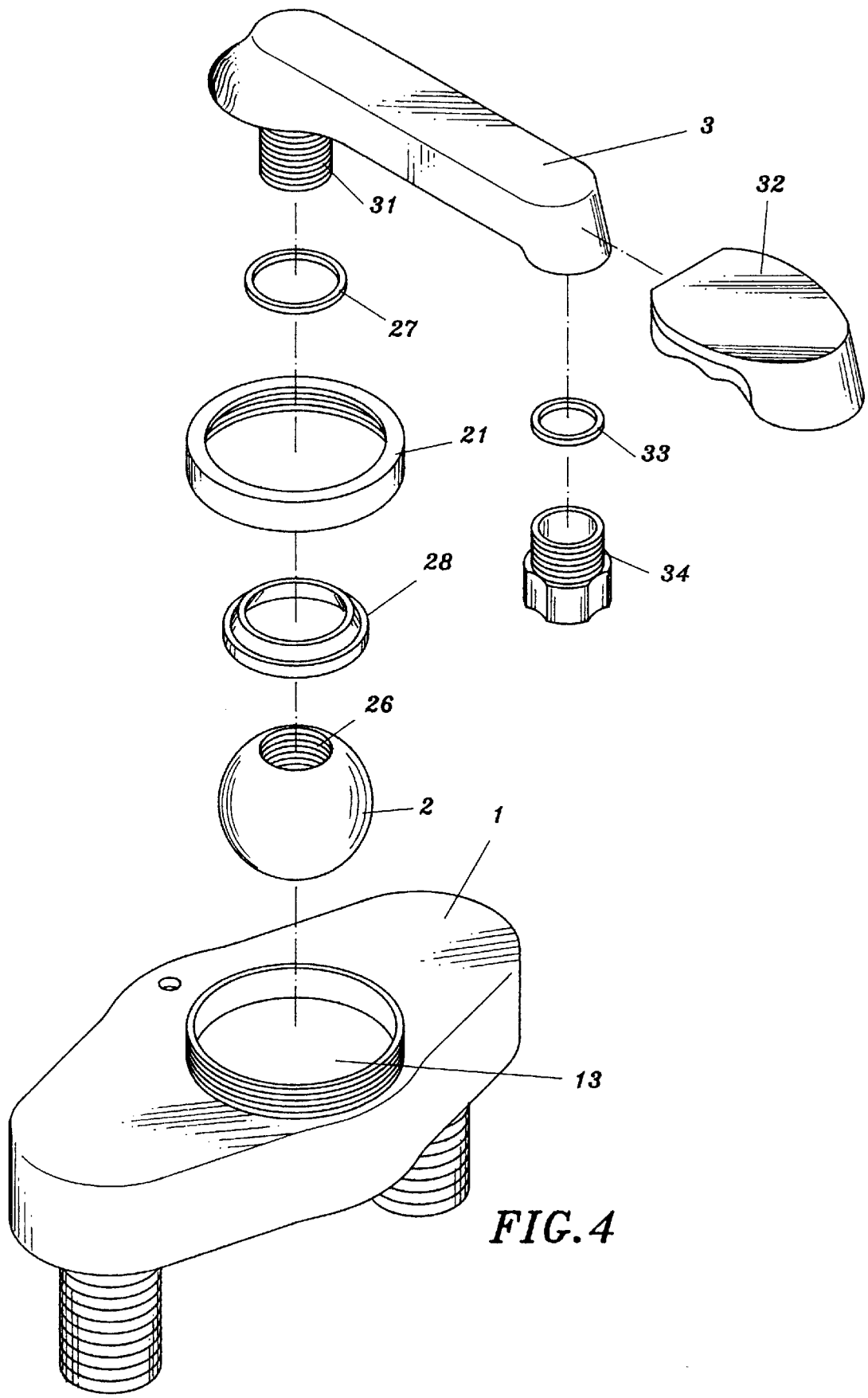
FIG. 4 is an exploded perspective view of the faucet shown in FIG. 3.
Figure 5A:
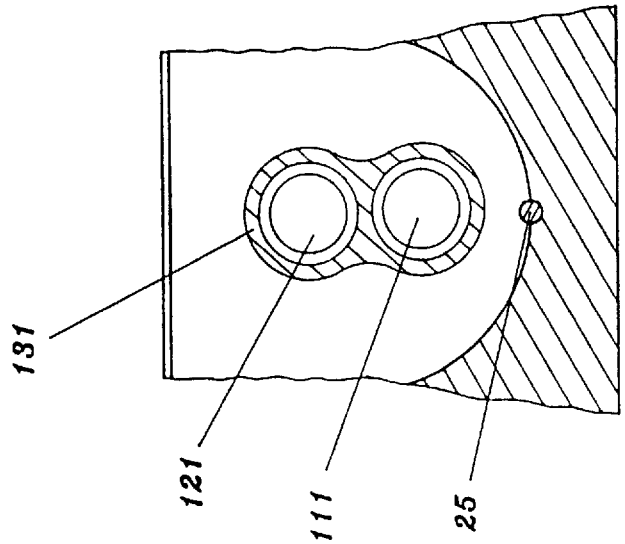
FIG. 5A is a cross sectional view of the hot and cold water outlets taken from a sectional line A—A.
Figure 5:
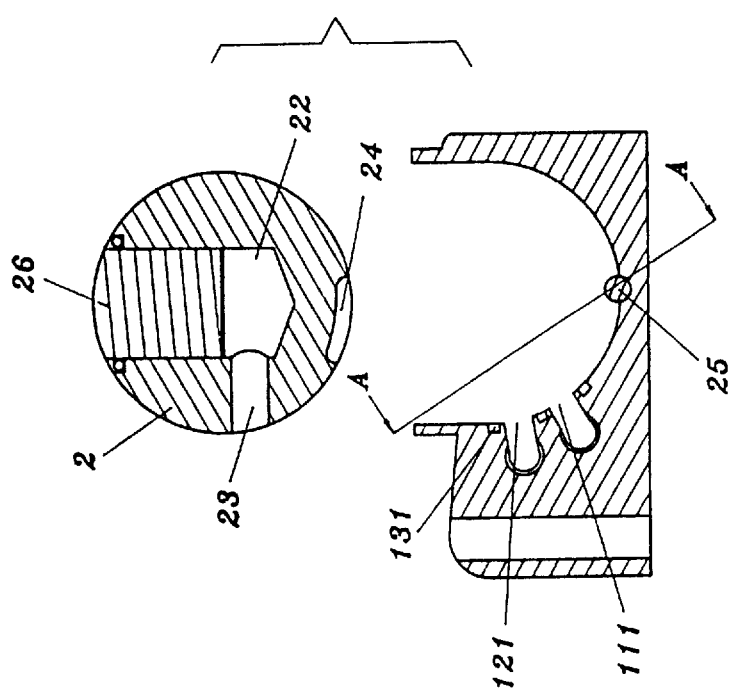
FIG. 5 is a sectional view of the ball valve and the valve seat.
Figure 6:
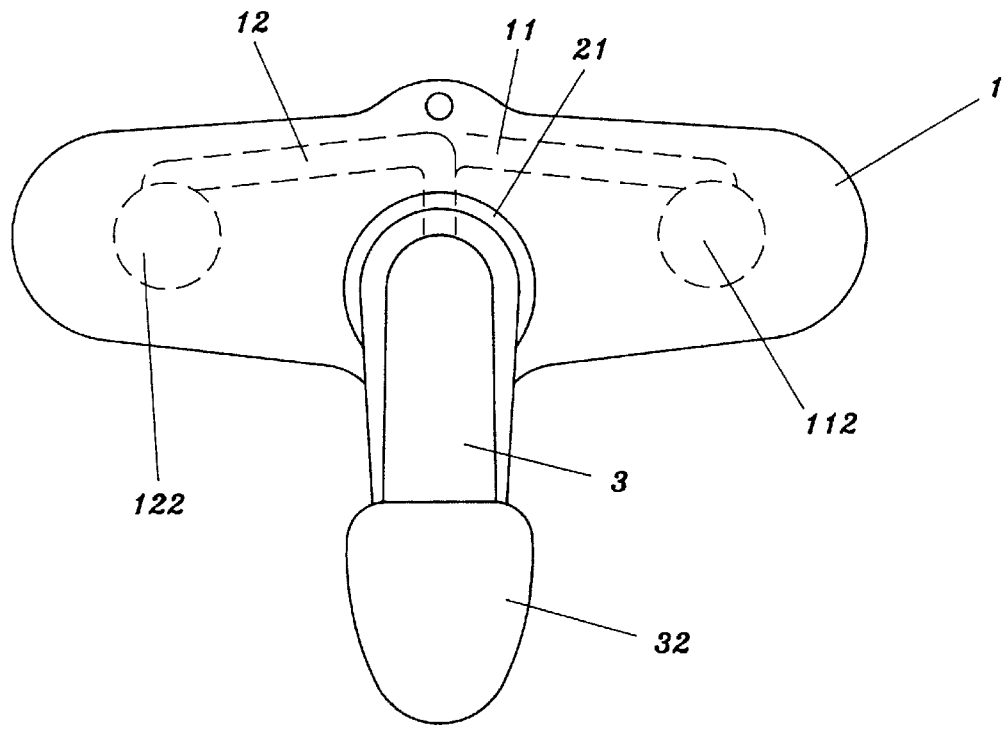
FIG. 6 is a top plan view of the faucet.
Figure 7:
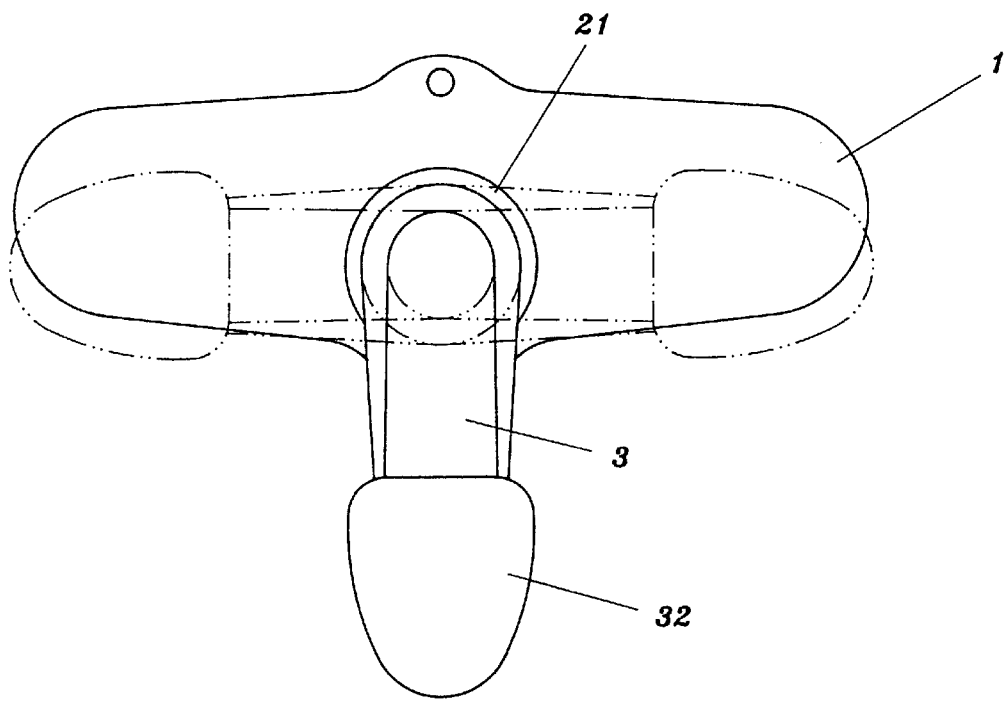
FIG. 7 is a schematic and top plan view of the operational movement of the faucet.

The present invention can be better understood as refer to the preferred embodiment and the detailed description made thereof.

Referring to FIGS. 3, 4, 5,5A, 6 and 7, the faucet made according to the present invention generally comprises a housing 1 having an elongate and circular shape. The housing 1 is provided with a ball valve seat 13 in the central and upper position. The ball valve seat 13 is provided with a cold water outlet 111 and a hot water outlet 121 in the rear portion. The housing 1 is provided with a cold water inlet 112 and a hot water inlet 122 at both lower side portions. A cold water pipe 11 is connected between the cold water inlet 112 and the cold water outlet 111. Similarly, a hot water pipe 12 is connected between the hot water inlet 122 and the hot water outlet 121. The cold water outlet 111 and the hot water outlet 121 on the ball valve seat 13 are disposed with a Teflon ring 131 respectively, as clearly shown in FIG. 5A. The Teflon ring 131 is enveloped and retained on the outer peripheral of the cold water outlet 111 and the hot water outlet 121 such that the Teflon ring 131 will not move upward and downward with the movement of the handle. The Teflon ring 131 can sustain higher pressure and the Teflon ring 131 will also not easy to age or deteriorate under high temperature environment. The bottom of the vertical axis of the ball valve seat 13 is disposed with a ball 25 which is embedded within the bottom of the ball valve seat 13 of the housing 1. The upper portion of the ball 25 is movably received within an elongate groove 24 of the ball valve 2. By this arrangement, the ball valve 2 may readily move upward/downward as well as left and right to adjust the water flow as well as the temperature. The ball valve 2 is concentric with the ball valve seat 13 and when the ball valve 2 is seated within the ball valve seat 13, a water-tight engagement can be attained. The top and side portions of the ball valve 2 are provided with a passage respectively and those top passage and side passage jointly define a pipe 22 thereof. The side outlet of the pipe 22 at the ball valve 2 is the pipe inlet 23 which can be aligned with the cold water outlet 111 or hot water outlet 121 to receive cold or hold water. The upper outlet of the pipe 22 is provided with a threaded portion and is the pipe outlet 26. The pipe outlet 26 is provided with leakage-proof washer 27 to enhance the water tightness between the spout 3 and the ball valve 2. In order to ensure the ball valve 2 may tightly contact with the Teflon ring 131 and the linear movement of the ball 25 within the guiding groove 24, a valve lid 21 is provided and is locked to the housing 1 from the top such that the ball valve 2 can be locked. A leakage-proof washer 28 is also disposed between the housing 1, the ball valve 2, and the ball valve lid 21 to increase the water tightness therebetween. The end portion of the spout 3 is also provided with threaded portion 31 which can be tightly locked with the ball valve 2. The front portion of the spout 3 is also provided with a handle 32 and which is provided with a Teflon ring 33 for leakage-proof. Finally, a spout unit 34 having a screen is attached thereof. As a result, the user can be prevented from being injured by the spout 3 which can be heated by the hot water. Accordingly, a convenient and safe faucet is attained.

Figure 8:
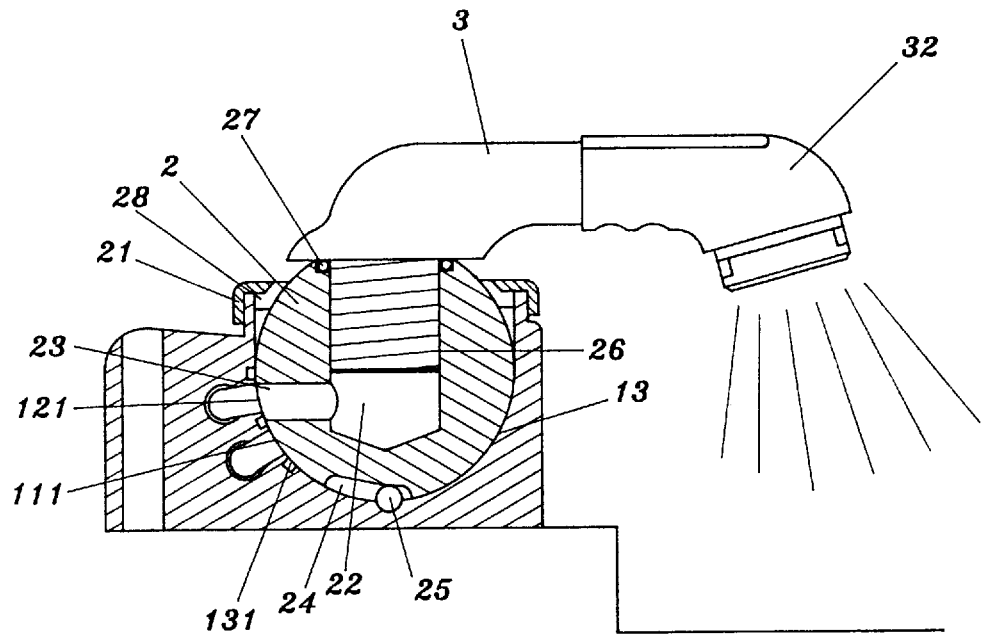
FIG. 8 is a partially cross sectional view of the faucet according to the present invention while the outflow is hot.
Figure 9:
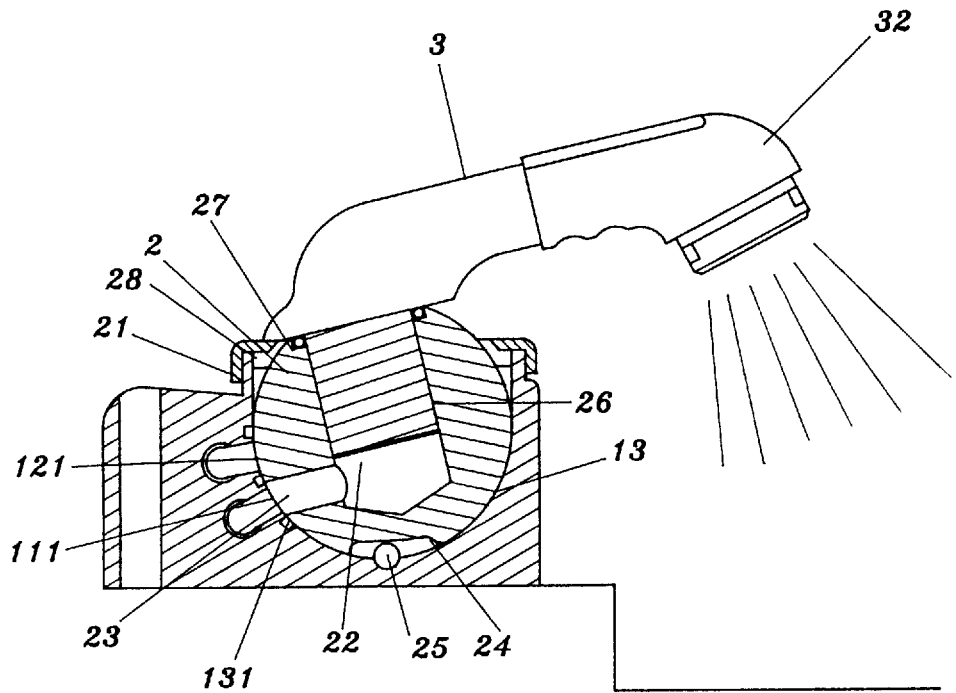
FIG. 9 is a partially cross sectional view of the faucet according to the present invention while the outflow is cold.

From the above described configuration, when the spout 3 is aligned with the sink, a maximum water outflow can be attained. When the spout 3 is disposed horizontally, referring to FIG. 8, the outflow is hot water. In this situation, the ball 25 is located at the lower dead point of the guiding groove 24. When the spout 3 is moved upward and gradually, the cold water is also introduced and the temperature of outflow is lowered, i.e. a warm water is attained. As the ball 25 moves to the upper dead point of the guiding groove 24, the outflow is cold water. When the spout 3 is moved left or right, the volume is decreased. The outflow is completely blocked when the spout 3 is tilted to a preset angle. The upward/downward and the left/right movement of the spout 3 will not interfere with each other. However, the upward and downward movement of the spout 3 are suitably controlled by the cooperation of the ball 25 and the guiding groove 24. However, no limitation to the left and right movement of the spout 3. When the outflow is blocked, the spout 3 can be shifted to the upper portion of the housing 1. Consequently, the spout 3 will not bring an inconvenience to the user when he/she cleans the sink.

The improved faucet made according to the present invention can be concluded with the following advantages.

1. The spout 3 can be completely shifted to the upper portion of the housing 1 after the outflow is completely blocked. As a result, the cleaning of the sink will not be interfered. Besides, the spout 3 can be readily controlled by both right and left hands respectively.
2. The rubber ring or washer is suitable replaced by the Teflon ring or washer and no aging or deterioration will be occurred even under high temperature.
3. The overall faucet features a reduced number of components. Consequently, the faucet can be readily made and in a lower cost.
4. The cold and hot water are separated and the outflow of the cold and hot water are directed respectively. Since there is not storing space for the cold and hot water, no backflow will be occurred. As a result, the controlling to the other faucets will not be influenced.
5. The open or close of the faucet can be readily and visually determined. As a result, the waste of water resulted from opened faucet can be avoided after the water supply is resumed because in the existing faucet, it is impossible or difficult to determine the open and/or close status visually.
6. The faucet features a fashioned and aesthetic style.

While particular embodiment of the present invention has been illustrated and described, it would be obvious to those skilled in the art that various other changes and modifications can be made without departing from the spirit and scope of the invention. It is therefore intended to cover in the appended claim all such changes and modifications that are within the scope of the present invention.

What I claim is:

1. An improved faucet of the type which comprises a housing, a ball valve seat, a spout and a ball valve lid, wherein said housing is provided with a ball valve seat in the central and upper position, said ball valve seat being provided with a cold water outlet and a hot water outlet in the rear portion, said cold water outlet and said hot water outlet of said ball valve seat being disposed with a Teflon ring respectively, said cold and hot water outlets being directed to the cold and hot water inlets of said housing by means of a cold and a hot water pipe respectively, the bottom of said ball valve seat being disposed with a ball;

said ball valve being provided with passages at top and side portions and which are in fluid communication with each other forming a pipe, said pipe being defined with an threaded outlet atop, said pipe being defined with an inlet at side portion, a guiding groove being defined at the lower portion of said ball valve;

a spout which has a threaded lower portion and a leakage-proof washer being engaged with said ball valve, said spout being provided with a controlling handle at the front portion and which is heat-proof, said handle being integrally formed with the front portion of said spout for ready manipulation of said spout in a convenient and safe manner;

said ball valve being seated within said ball valve seat, a ball valve lid being covered over said ball valve seat after enveloped over said spout, said ball valve lid being locked to said housing, said ball valve lid being provided with a leakage-proof washer;

wherein when said spout is moved upward/downward and left/right, the inlet of said pipe of said ball valve can be respectively aligned with the cold/hot water outlets of said ball valve seat of said housing, the volume and water temperature of the outflow can be readily controlled, wherein when said spout is aligned to said sink, a maximum outflow from said spout is attained, wherein when said spout is shifted from said sink, said faucet is blocked and which can be visually determined.

* * * * *